Nov. 8, 1932.  W. BOPPENHAUSEN  1,886,784

CHAIN

Filed March 22, 1932

Patented Nov. 8, 1932

1,886,784

UNITED STATES PATENT OFFICE

WILLI BOPPENHAUSEN, OF PFORZHEIM, GERMANY, ASSIGNOR TO ANDREAS DAUB A.-G., OF PFORZHEIM, GERMANY, A CORPORATION OF GERMANY

CHAIN

Application filed March 22, 1932, Serial No. 600,541, and in Germany July 10, 1931.

This invention relates to chains which are employed for personal wear or use, either as articles of jewelry or in connection with personal articles such as powder compacts, purses and the like, and the method of making them.

Closed link chains for articles of jewelry are known, and links in chains of known construction, when twisted in one direction, are nested side by side and such chains have the appearance of cord chains for which they will serve as a substitute. Cord chains are more expensive to manufacture than the aforesaid loose link chains, but loose link chains of known type when twisted in a direction opposite to that in which the links are nested as aforesaid lose the appearance of a cord chain and this is undesirable.

It is an object of this invention to provide chains having loosely connected links in which the links are not liable to be displaced to a degree which will cause a change in the appearance of the chain and it is furthermore an object to provide novel means by which the links interengage, one lying in a recess formed in the outer surface of the other. The recess constitutes a seat with shoulders at each end of the seat that engage the link in the seat, the shoulders acting to prevent twisting of one link with respect to the other. In other words, by reason of the recessed links they are more closely nested and free play of the links laterally is minimized. In fact, the relation of parts precludes movement which will permit distortion of the links to a degree which will cause a changed appearance.

It is a further object of this invention to produce a chain comprising intermeshing links and to so proportion the links with respect to the gage of the wire employed that the distance between two links, which intermesh an interposed link, is minimized.

It is a further object of this invention to provide links having the aforesaid recesses and preferably to produce such recesses at the joint between the ends of a link by notching or cutting away portions of the side of the link at its ends so that when the two ends are brought together the notch or recess will result.

In producing a chain of the character indicated certain steps are followed in shaping and assembling the links and it is the purpose of the inventor to provide a chain of this character which will be comparatively inexpensive to manufacture and that will prove strong and durable.

With the foregoing and other objects in view, the invention consists in the details of construction and in the arrangement and combination of parts to be hereinafter more fully set forth and claimed.

In describing the invention in detail, reference will be had to the accompanying drawing forming part of this application wherein like characters denote corresponding parts in the several views, and in which—

The links of the chain are produced by the use of sections of wire of appropriate length, and each section 5 is provided with notches 6 and 7 at its ends on those parts preferably that will be located at the periphery of the link when the wire is shaped to form a link. When the two ends of the link abut, the two notches will form a peripheral recess or seat and the end walls 8 and 9 of the recess will form shoulders to limit the movement of the links axially of the chain, as will presently appear. The same result may be attained by providing a notch in the wire at one end.

In the formation of a chain, the links are successively shaped and assembled in such interengagement as to produce a chain having the characteristics stated.

Figure 1:
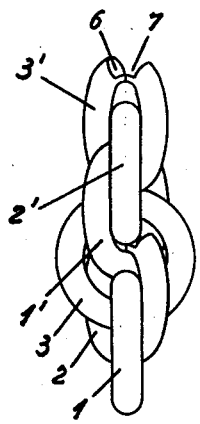
Figure 1 illustrates a view in elevation showing a plurality of links assembled to form a fragment of a chain.
Figure 2:
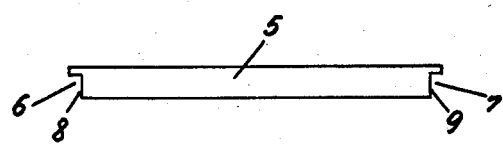
Figure 2 illustrates a detail view of a fragment of a wire from which a link is formed.
Figure 3:
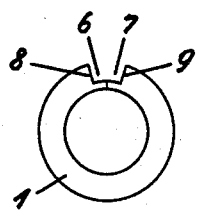
Figure 3 illustrates a view in elevation of a link having its ends closed and in condition to receive the succeeding links.
Figure 4:
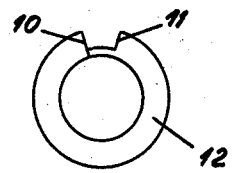
Figure 4 illustrates a modified form of link.

Assuming that a link 1 has been produced as shown in Figures 1 and 3, by the use of a section of wire cut or notched as heretofore described, a similar section of wire is inserted in the link 1 and bent around the link 1 for forming link 2. Another wire, similarly treated, is inserted through links 1 and 2 and bent to form the link 3 and all of the links have the same characteristics. The next link 1' is formed by passing a wire, such as 5, through the links 2 and 3 and located externally of that part of the link 1 which is in the link 3 (owing to the fact that in forming the link 3 the wire was inserted in link 1 and bent around it), the parts being so positioned that the link 1' will lie in the recess of the link 1 between the shoulders 8 and 9. The next link 2' is formed by passing a wire through the links 3 and 1' and bending it around these links, whereas it lies in a recess of the link 2 and may engage the shoulders 8 and 9 of that link. In forming the link 3', a wire 5 is passed through the links 1' and 2' and bent therearound, the said link 3' lying in the recess of the link 3. The foregoing steps may be repeated until a chain of the desired length is finished.

In shaping the links care should be taken to regulate the pressure applied to them, since undue or abnormal pressure may bend the contacting ends of the wire and so distort them as to restrict the area of the recess between the shoulders 8 and 9.

From the foregoing it will be apparent that the material or wire for each link is projected through two preceding links, and that the material or wire for two successive links is inserted in it. The fourth link does not pass through the first link but engages it by lying in the recess of its periphery.

It may, in practice, be desirable to form a link by notching but one end allowing the undisturbed end of the link to act as a shoulder 10 whereas the end wall of the notch would form a coacting shoulder 11 and that portion of the link below the notch as at 12 would act as a seat which with the shoulders 10 and 11 would contact an engaging link.

I claim:

1. A chain of the character described comprising a plurality of links, each link of the chain passing through two links immediately preceding, each link having a peripheral recess to receive a portion of a link which does not pass through it but which abuts it.

2. A chain of the character described comprising a plurality of links, each link of the chain passing through two links immediately preceding, each link having a joint and a peripheral recess at the joint to receive a portion of a link which does not pass through it but which abuts it.

3. A chain of the character described comprising a plurality of links, each link of the chain passing through two links immediately preceding, each link having a joint and a peripheral recess extending beyond each end of the joint to receive a portion of a link which does not pass through it but which abuts it.

WILLI BOPPENHAUSEN.